(12) United States Patent
Ray et al.

(10) Patent No.: US 10,775,050 B2
(45) Date of Patent: Sep. 15, 2020

(54) SECTIONABLE FLOOR HEATING SYSTEM

(71) Applicant: United States Gypsum Company, Chicago, IL (US)

(72) Inventors: Suman Sinha Ray, Chicago, IL (US); Ajith Mulky Rao, Gurnee, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 144 days.

(21) Appl. No.: 15/977,373

(22) Filed: May 11, 2018

(65) Prior Publication Data

US 2018/0335218 A1   Nov. 22, 2018

Related U.S. Application Data

(60) Provisional application No. 62/506,766, filed on May 16, 2017.

(51) Int. Cl.
  *F24D 13/02*  (2006.01)
  *H05B 3/34*   (2006.01)
  (Continued)

(52) U.S. Cl.
  CPC .......... *F24D 13/024* (2013.01); *E04F 15/166* (2013.01); *H05B 3/145* (2013.01);
  (Continued)

(58) Field of Classification Search
  None
  See application file for complete search history.

(56) References Cited

U.S. PATENT DOCUMENTS

| | | | | |
|---|---|---|---|---|
| 2,544,547 A | * | 3/1951 | Vogel | ........................ H05B 3/16 |
| | | | | 219/522 |
| 3,223,825 A | * | 12/1965 | Williams | .............. E01C 11/265 |
| | | | | 219/213 |

(Continued)

FOREIGN PATENT DOCUMENTS

| DE | 3042419 A1 | 8/1982 |
|---|---|---|
| DE | 10052345 A1 | 5/2002 |

(Continued)

OTHER PUBLICATIONS

Barzic, International Search Report for Application No. PCT/US2018/032900, dated Mar. 8, 2018.

(Continued)

*Primary Examiner* — Thor S Campbell
(74) *Attorney, Agent, or Firm* — Greer, Burns & Crain, Ltd.; Philip T. Petti; Pradip Sahu (57) ABSTRACT

A heating device for a floor includes a membrane, a plurality of heating elements attached to the membrane, at least one positively charged electrode attached to each of the heating elements and at least one negatively charged electrode attached to each of the heating elements, where the at least one positively charged electrode and the at least one negatively charged electrode are connected to an electrical power source and supply electrical power to the heating elements. The heating elements, the at least one positively charged electrode and the at least one negatively charged electrode are arranged on the membrane so that cutting of the membrane along a cutting line in any direction across the membrane does not disrupt the supply of electrical power to the heating elements.

15 Claims, 9 Drawing Sheets

(51) Int. Cl.
*H05B 3/14* (2006.01)
*E04F 15/16* (2006.01)
*H05B 3/36* (2006.01)

(52) U.S. Cl.
CPC .............. *H05B 3/34* (2013.01); *H05B 3/36* (2013.01); *H05B 2203/007* (2013.01); *H05B 2203/013* (2013.01); *H05B 2203/026* (2013.01)

(56) References Cited

U.S. PATENT DOCUMENTS

| | | | | |
|---|---|---|---|---|
| 3,878,362 A * | 4/1975 | Stinger | ................ | H05B 3/146 |
| | | | | 219/528 |
| 4,323,607 A * | 4/1982 | Nishimura | ............. | B29C 65/68 |
| | | | | 219/213 |
| 4,429,216 A * | 1/1984 | Brigham | ............... | H05B 3/145 |
| | | | | 219/528 |
| 6,184,496 B1 * | 2/2001 | Pearce | ................ | E01C 11/265 |
| | | | | 219/202 |
| 6,943,320 B1 * | 9/2005 | Bavett | ................... | H05B 3/34 |
| | | | | 219/213 |
| 7,308,193 B2 * | 12/2007 | Halsall | ................... | F24H 1/202 |
| | | | | 219/548 |
| 7,876,194 B2 * | 1/2011 | Ihle | ........................ | H01C 1/16 |
| | | | | 219/211 |
| 8,288,693 B2 * | 10/2012 | Weiss | ..................... | H05B 3/342 |
| | | | | 219/528 |
| 8,816,251 B2 * | 8/2014 | Olsen | ..................... | F24D 3/141 |
| | | | | 219/212 |
| 9,290,890 B2 * | 3/2016 | Naylor | ................. | E01C 11/265 |
| 9,297,541 B1 * | 3/2016 | McGillycuddy | ........ | F24D 13/00 |
| 2005/0067402 A1 * | 3/2005 | Green | ................... | H05B 3/347 |
| | | | | 219/515 |
| 2005/0067404 A1 * | 3/2005 | DeAngelis | .......... | H05B 1/0294 |
| | | | | 219/545 |
| 2005/0067405 A1 * | 3/2005 | DeAngelis | ............... | H05B 3/34 |
| | | | | 219/549 |
| 2010/0320191 A1 * | 12/2010 | Von Wachenfeldt | .... | H05B 3/28 |
| | | | | 219/548 |
| 2012/0273479 A1 | 11/2012 | Kim | | |

FOREIGN PATENT DOCUMENTS

| | | |
|---|---|---|
| DE | 202006007731 U1 | 8/2006 |
| EP | 2618630 A2 | 7/2013 |
| EP | 2921084 A1 | 9/2015 |
| JP | 2007149598 A | 6/2007 |
| WO | 2011128899 A2 | 10/2011 |

OTHER PUBLICATIONS

Schwaiger, International Search Report from PCT/US2019/059068 dated Mar. 23, 2020 (5 pages).

* cited by examiner

SECTIONABLE FLOOR HEATING SYSTEM

BACKGROUND

The present invention relates to a flooring system, and more specifically, to a heating device for a flooring system that generates radiant heat underneath a floor so that the floor is at a comfortable temperature for directly receiving a user's bare feet, along with other body parts directly contacting the floor.

There are two basic ways to supply heat to a floor: hot water or electricity. Hot-water or "hydronic" systems circulate water from a boiler or water heater through loops of tubing installed beneath a floor. The flexible tubes are installed in a variety of ways, such as on top of a subfloor in grooved panels or snap-in grids, or embedded in poured concrete. Once the heating system is in place, the heating system can be covered by finished flooring, including hardwood or tile. The issues with these systems are that they are complex, require significant time and effort to install and are expensive.

Figure 1:
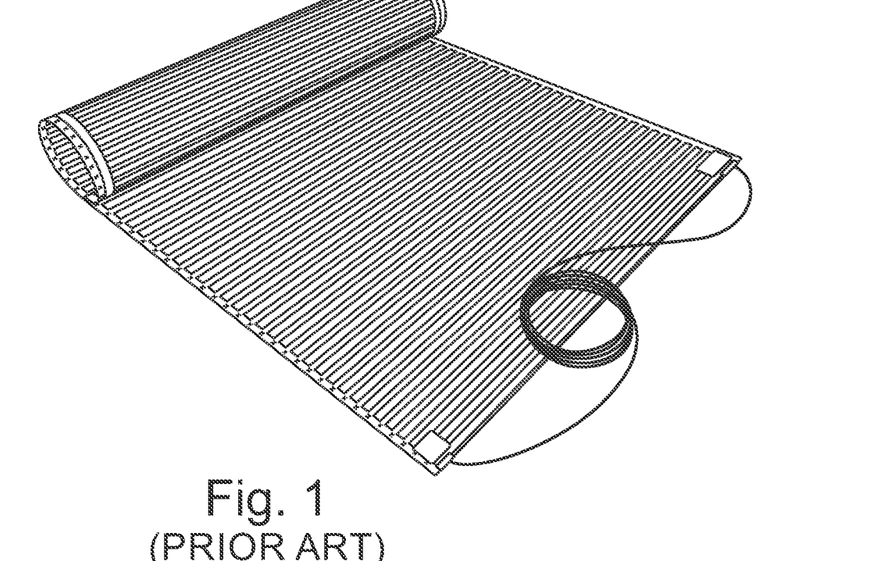
FIG. 1 is a schematic drawing of a prior art type of electrical floor heating system.

An electric system provides radiant heat from one or more heating elements connected to an electrical power source. Referring to FIG. 1, one type of electrical heating system is shown and includes thin resistors, namely, thin film resistors, positioned between and electrically connected to two bus bars acting as a positively charged terminal and a negatively charged terminal, the bus bars being located on opposing sides of a base substrate. Typically, the base substrate is made of a flexible material, such as a flexible plastic or fiberglass, so that the heating system can be rolled up and transported to a location for installation. After installation, electricity is supplied to the heating elements, which causes the heating elements to generate heat that is directed to the bottom surface of a finished floor installed above the heating system.

Figure 2:
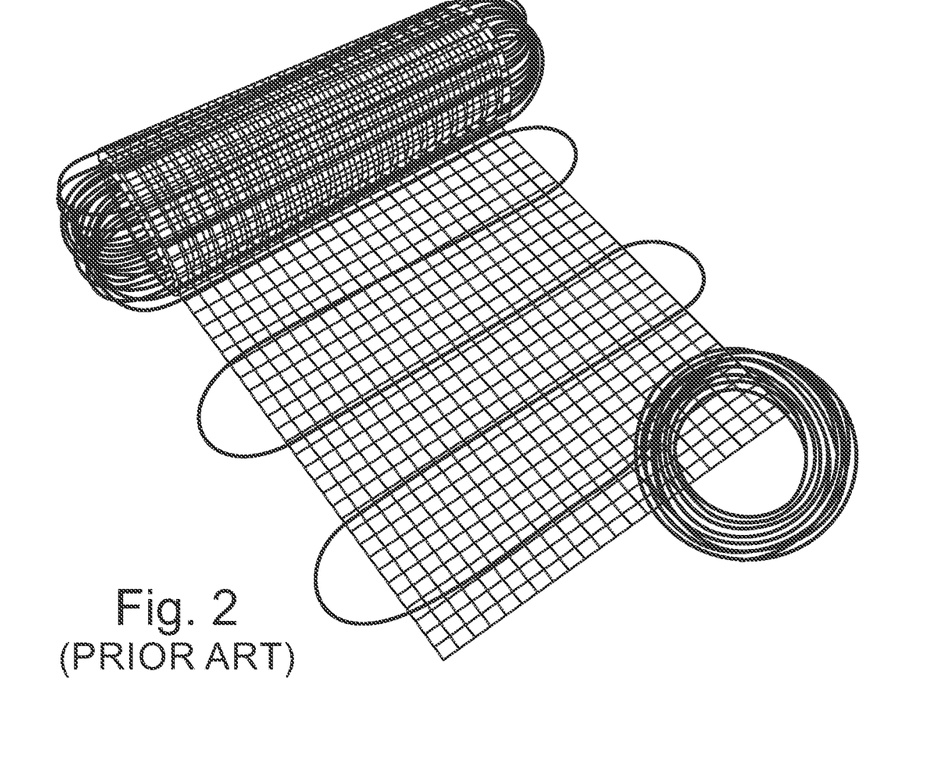
FIG. 2 is a schematic drawing of another type of electrical floor heating system.

FIG. 2 shows an alternative known electrical heating system in which an electrical wire or cable is attached to a base substrate and winds between the opposing sides of the base substrate. The electrical wire is attached to a power source which supplies electricity to the wire to cause the wire to generate heat beneath a finished floor. Since the electrical heating systems shown in FIGS. 1 and 2 do not require a boiler, water, or tubing as with the hot water heating system, less space is needed underneath the finished floor to install the electrical heating systems.

Figure 3:
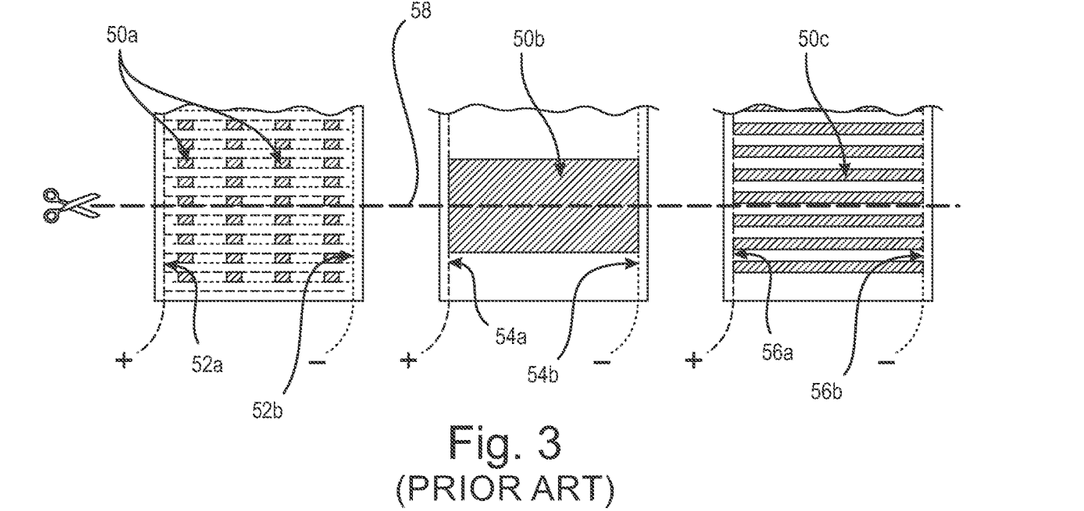
FIG. 3 are schematic drawings of different electrical diagrams for electrical floor heating systems.

FIG. 3 is an example of a conventional electrical heating system that includes a positively charged electrode or anode 52a attached to one side of a base substrate and a negatively charged electrode or cathode 52b attached to an opposing side of the base substrate. Typically, the positively charged electrode and the negatively charged electrode are bus bars attached to the opposing sides of the base substrate. The anode and the cathode are electrically connected to heating elements 50a, which are spaced apart at different locations on the base substrate, and supply electricity to the heating elements from an electrical power source (not shown). Alternatively, in other examples, a single heating element 50b extends between the anode 54a and the cathode 54b, or the heating elements 50c are formed as elongated strips that extend between the anode 56a and the cathode 56b. In these systems, the configuration and positioning of the heating elements depends on the layout of the floor and the size and shape of the room.

A problem with the above-described known electrical heating systems is that the base substrate typically must be cut to size to accommodate a corner or other obstacle in a room where the electrical heating systems are being installed. Given that the heating elements and associated electrical connections extend in only one direction between the opposing electrodes on the base substrate, the base substrate must likewise be cut in a single direction along a cutting line 58 (FIG. 3) that is parallel to the heating elements, otherwise the electrical circuit will be cut or severed thereby breaking the electrical connection between the positive and negative electrodes and preventing the heating elements from generating heat underneath the finished floor. As such, more time and materials are used to install such electrical heating systems, and more waste materials are generated.

Accordingly, there is a need for a heating system for placement underneath a floor that can be cut to size in any direction to accommodate different floor layouts.

SUMMARY

Embodiments of the present floor heating system include a heating device having several heating elements attached to a flexible substrate or membrane. Each of the heating elements is electrically connected to positively and negatively charged electrodes that supply electrical power to the heating elements and cause the heating elements to generate and apply heat to a finished floor situated on top of the heating device. The heating elements are arranged on the membrane so that the membrane may be cut in any direction or pattern without disrupting the supply of electricity to the heating elements in the section of the heating device being used to heat a floor. The present heating system thereby saves significant time and money during installation.

In an embodiment, a heating device for a floor is provided and includes a membrane, a plurality of heating elements attached to the membrane, at least one positively charged electrode attached to each of the heating elements and at least one negatively charged electrode attached to each of the heating elements, where the at least one positively charged electrode and the at least one negatively charged electrode are connected to an electrical power source and supply electrical power to the heating elements. The heating elements, the at least one positively charged electrode and the at least one negatively charged electrode are arranged on the membrane so that cutting of the membrane along a cutting line in any direction across the membrane does not disrupt the supply of electrical power to the heating elements.

In another embodiment, a heating mat is provided and includes an insulating layer including a plurality of heating elements, a positive grid layer including a positively charged electrode attached to each of the heating elements on a first side of the insulating layer, a negative grid layer including a negatively charged electrode attached to each of the heating elements on a second side of the insulating layer, where the positive grid layer and the negative grid layer are connected to an electrical power source and supply electrical power to the heating elements, and a grounding layer attached to the positive grid layer. The insulating layer, the positive grid layer, the negative grid layer and the grounding layer are arranged so that cutting of the mat along a cutting line in any direction across the mat does not disrupt the supply of electrical power to the heating elements.

DETAILED DESCRIPTION

The present floor heating system includes a flexible heating device having heating elements arranged in a pattern on a membrane that enables the heating device to be cut to any size or shape to accommodate different floor layouts and save significant time during installation.

Figure 4:
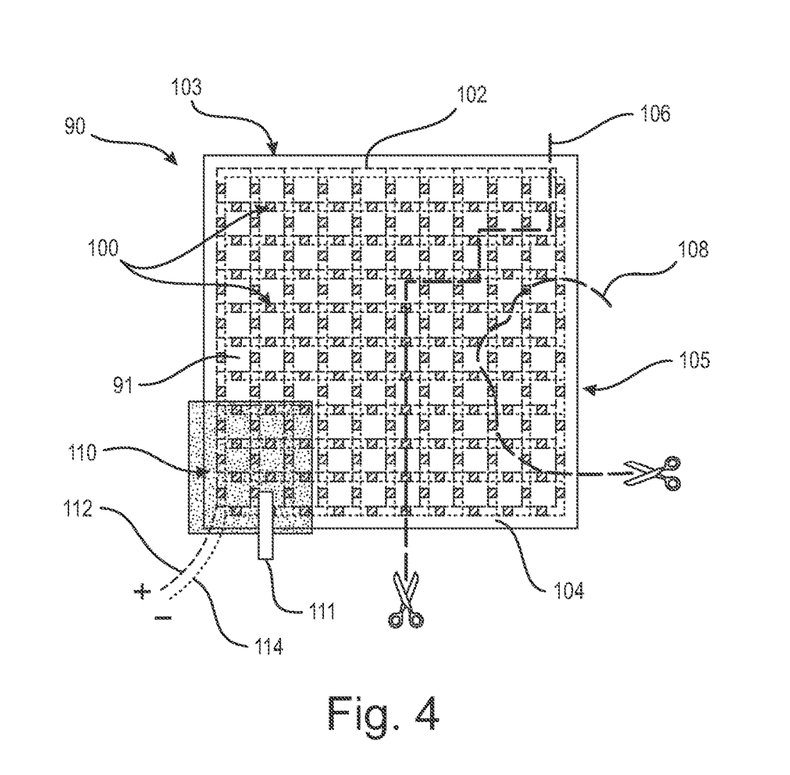
FIG. 4 is a schematic drawing of an embodiment of the present floor heating system where the heating elements are arranged in a grid pattern.

Referring to FIG. 4, an embodiment of the present floor heating system includes a heating device 90 having a flexible mat or membrane 91 made of an insulating material or insulator, such as plastic, fiberglass or other suitable material. Several heating elements 100 are arranged on the membrane 91 in a pattern such as the grid pattern shown in FIG. 4. Electricity is supplied to the heating elements 100 by positively charged electrodes or anodes and negatively charged electrodes or cathodes that are arranged in the grid pattern. As shown in the illustrated embodiment, each heating element 100 is connected to an anode 102 and a cathode 104 to supply an electrical current to the heating elements, which causes the heating elements to generate heat. The electrical current is supplied to the anodes 102 and cathodes 104 by positive and negative electrical wires or cables 112, 114 located at a corner or end of the membrane 91. In an embodiment, the electrical wires 112, 114 are attached to a plug connector (not shown), which is connected to or plugged into a power source, such as an electrical outlet. In another embodiment, the electrical wires 112, 114 are directly connected or hardwired to an electrical junction box. It should be appreciated that the electrical wires 112, 114 are connectable to any suitable power source. In the illustrated embodiment, the heating device 90 has a thin profile and may be any suitable thickness that enables the heating device to be installed beneath a finished floor.

As shown in FIG. 4, the heating elements 100 and the anodes 102 and cathodes 104 are arranged so that the membrane 91 can be cut to any desired sized and shape without breaking or disrupting the electrical circuit, i.e., the supply of electrical current to the heating elements. For example, the cutting line 106 is a staggered line that extends in two different directions, i.e., along the length and width, of the membrane 91 and separates the membrane into a first, heating section 103 and a second, non-heating section 105. The staggered cutting line 106 would be contemplated to accommodate a staggered wall, appliances or other fixed objects on or surrounding a floor.

Referring again to FIG. 4, the grid pattern of the heating elements 100 and the anodes 102 and cathodes 104 in the first section 103 maintains the supply of electrical current to the heating elements since the anodes and cathodes 102, 104 connecting the heating elements 100 to the electrical power source remain intact, i.e., are not severed by the cutting of the membrane 91 along the cutting line 106.

In another example, a second cutting line 108 is a non-linear cutting line for accommodating rounded or curved walls, corners, appliances or other objects on or surrounding a floor. As shown by the different cutting lines 106, 108, a feature of the present heating device 90 is that it is designed to be cut according to any desired pattern or along any desired cutting lines including linear cutting lines, non-linear cutting lines or any combination of linear and non-linear cutting lines, without affecting the heating capacity of the heating elements 100 located in the first heating section 103 of the heating device.

A portion of the heating device 90 is designated as a no-cut zone or area 110 to ensure that the electrical connections to the anodes and cathodes 102, 104 are not cut or severed by cuts along a desired cutting line. The no-cut zone 110 may be any suitable size and shape depending on the configuration of the heating elements 100 on the membrane 91. Additionally, in an embodiment, at least one thermocouple 111 is connected to the heating device 90 in the no-cut zone 110 to measure the temperature of the first section 103 of the heating device and maintain the heating device at a designated temperature to help prevent overheating. Connecting the thermocouple 111 to the membrane 91 in the no-cut zone 110, protects the thermocouple from being damaged or broken when the heating device 90 is cut. It should be appreciated that the thermocouple 111 may be any suitable temperature measuring device.

Figure 5:
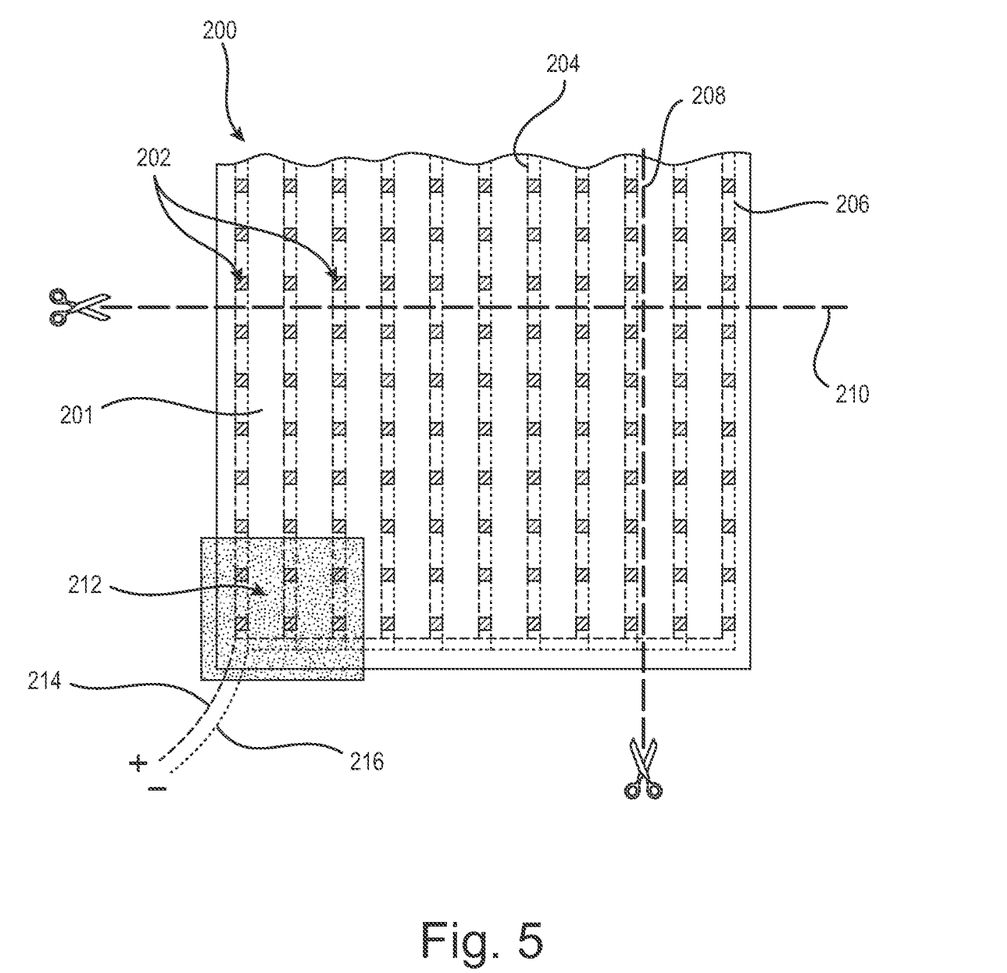
FIG. 5 is a schematic drawing of another embodiment of the present floor heating system where the heating elements are arranged in a single direction on the membrane.

Referring to FIG. 5, another embodiment of the present heating device 200 is shown and includes heating elements 202, anodes 204 and cathodes 206 that are arranged on the membrane 201 in a single direction, namely, along the length of the membrane. The heating elements 202, anodes 204 and cathodes 206 may also be arranged along the width of the membrane, in a diagonal pattern or in any suitable direction or pattern. In the illustrated embodiment, the heating elements 202 are spaced apart a designated distance from each other. The spacing of the heating elements 202 is determined by the desired heat output or heat capacity for a particular finished floor or floors. In this embodiment, the anodes and cathodes 204, 206 are connected to an electrical power source by electrical wires 214, 216 located at a corner of the heating device 200. It should be appreciated that the electrical wires may be located at any suitable location on the heating device 200. As shown in FIG. 5, the arrangement of the heating elements 202 enables the heating device 200 to be cut across the width of the membrane 201 as shown by cutting line 210, or along the length of the membrane 201 as shown by cutting line 208, without severing and thereby disrupting the electrical connection to the heating elements. It should be appreciated that both cutting lines 208 and 210 can be made along the membrane 201 or at any suitable location on the membrane other than the no-cut zone 212.

Figure 6:
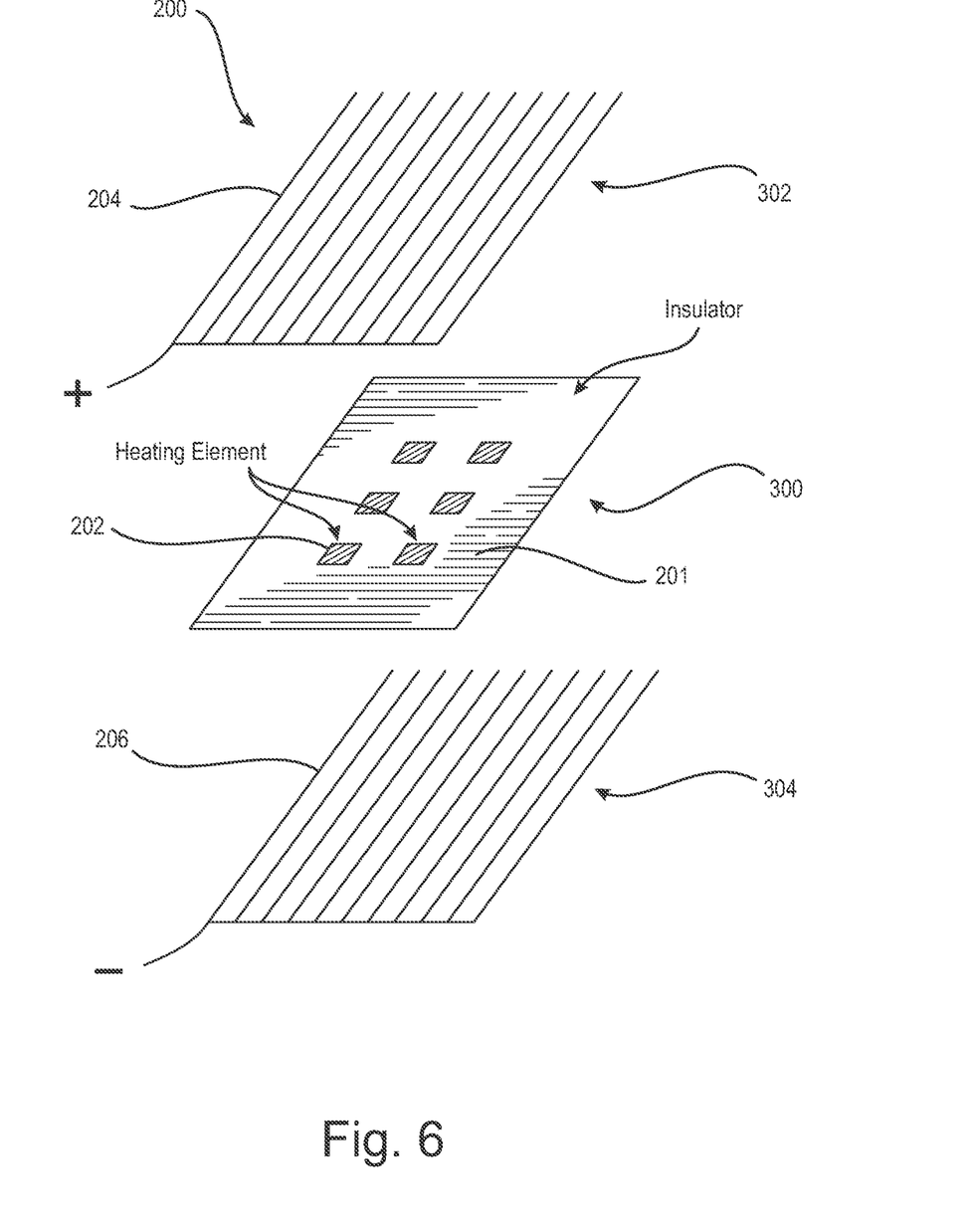
FIG. 6 is an exploded perspective view of a further embodiment of the present floor heating system.
Figure 7:
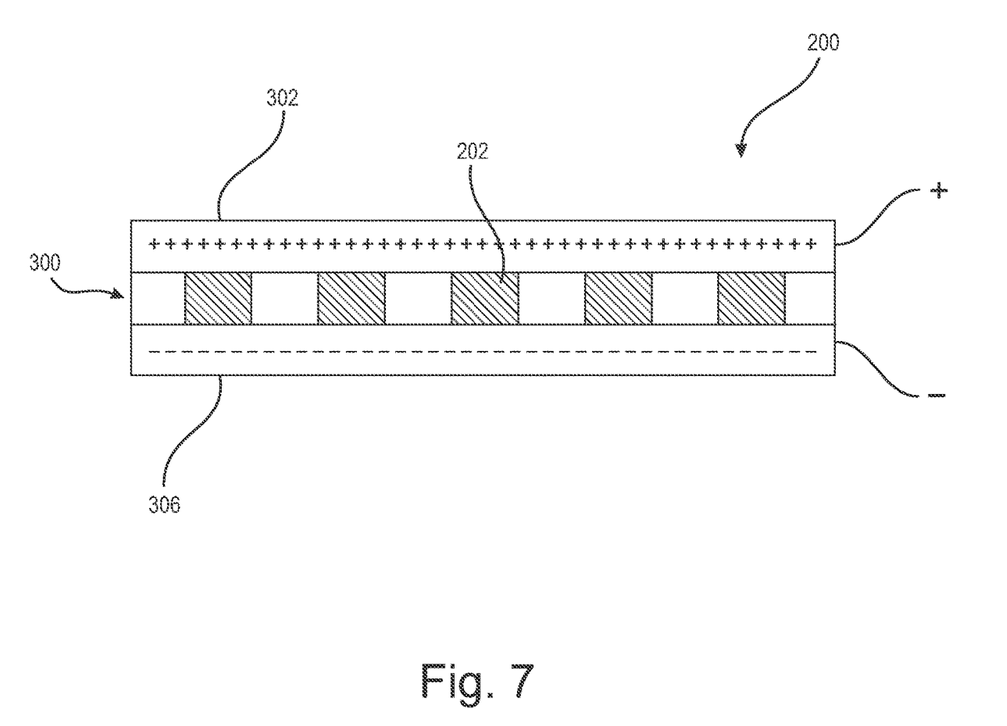
FIG. 7 is a cross-section view of the floor heating system of FIG. 6 where the first, second and third layers are attached together.

Referring to FIGS. 6 and 7, an embodiment of the construction of the heating device 200 of FIG. 5 is shown where heating device includes a first layer 300 having a membrane 201 made of an insulating material or insulator, such as plastic, and one or more heating elements 202 attached to or embedded in the membrane 201 so that opposing surfaces of the heating element or heating elements 202 are exposed on each side of the membrane. A second layer 302 including a plurality of interconnected anodes 204 having a positive charge is attached to a first side of the first layer 300 such that the anodes 204 are connected to a corresponding surface of each of the heating elements 202. A third layer 304 including a plurality of interconnected cathodes 206 having a negative charge is attached to a second side of the first layer 300, which is opposite to the first side. The cathodes 206 are connected to a corresponding surface of each of the heating elements 202. In this way, the connection of the anodes 204 and cathodes 206 to opposing surfaces of the heating element(s) 202 causes the electrical current to flow to the heating element(s) 202 to generate heat. It should be appreciated that the heating elements 202, the anodes 204 and the cathodes 206 may be arranged in any suitable direction or pattern on the membrane 201.

Figure 8:
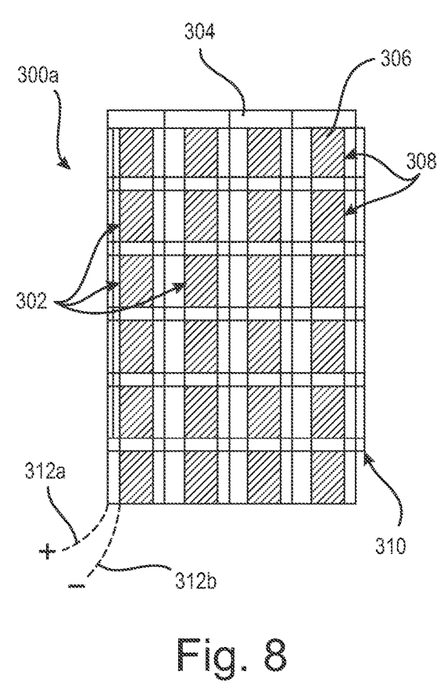
FIG. 8 is a schematic drawing of another embodiment of the present floor heating system.
Figure 9:
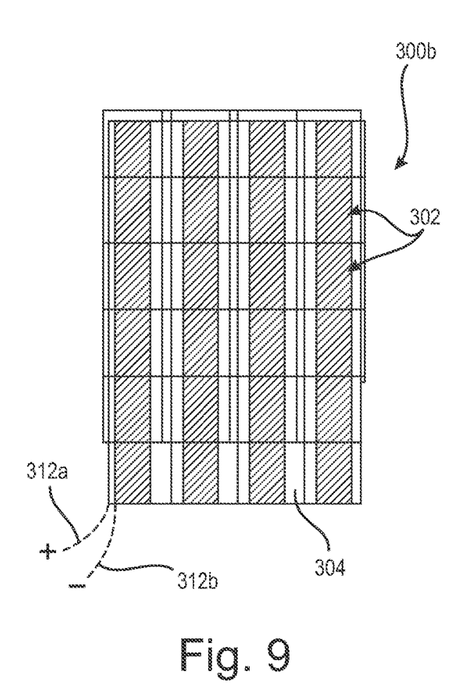
FIG. 9 is a schematic drawing of a further embodiment of the present floor heating system.

Referring to FIG. 8, another embodiment of the construction of the heating device is shown where the heating device 300a includes individual heating elements 302 that are printed on a membrane or substrate 304 and arranged in a grid pattern. In this embodiment, the heating elements 302 are printed on the substrate 304 with a carbon ink 306 having a designated resistance such that the heating elements 302 may operate at voltages ranging from 6 volts to 240 volts depending on the designated resistance. It should be appreciated that carbon ink 306 may be any suitable ink or combination of inks that are used to form heating elements. As shown in FIG. 8, the carbon ink segments 308 forming the heating elements 302 may have rectangular shapes or any suitable shape or combination of shapes. Further, the carbon ink segments 308 may vary in size. For example, each of the carbon ink segments 308 may be 2 inches by 2 inches to 6 inches by 6 inches in size, and may be printed on the substrate 304 using screen printing, flexographic printing, gravure printing or any suitable printing method. The carbon ink 306 may also be sprayed onto the substrate 304 to form the heating elements 302. In the illustrated embodiment, one or more bus bars 310 are attached to the substrate 304 and receive electricity from electrical wires 312a and 312b, and distribute electrical power to the heating elements. The bus bars 310 may be copper tape attached to the substrate 304 or copper ink printed on the substrate with the heating elements 302. It should be appreciated that the bus bars 310 may also be made of aluminum or other materials suitable for busing the electrical current. In the illustrated embodiment, different power sources may be used to supply electrical power to the bus bars 310 through the electrical wires 312a, 312b. For example, the heating elements 302 may be powered by an AC or DC power source, wirelessly powered or powered by any suitable power source or combination of power sources. The discrete, separated ink segments 308 shown in FIG. 8 are one way to form the heating elements 302. Alternatively, in another embodiment, the heating device 300b includes heating elements 302 formed as long strips of carbon ink printed on the substrate 304 as shown in FIG. 9. In addition to the design layouts of the heating elements 302 shown in FIGS. 8 and 9, several different design layouts are possible by printing carbon ink or other suitable conductive ink on the substrate 304.

Figure 10:
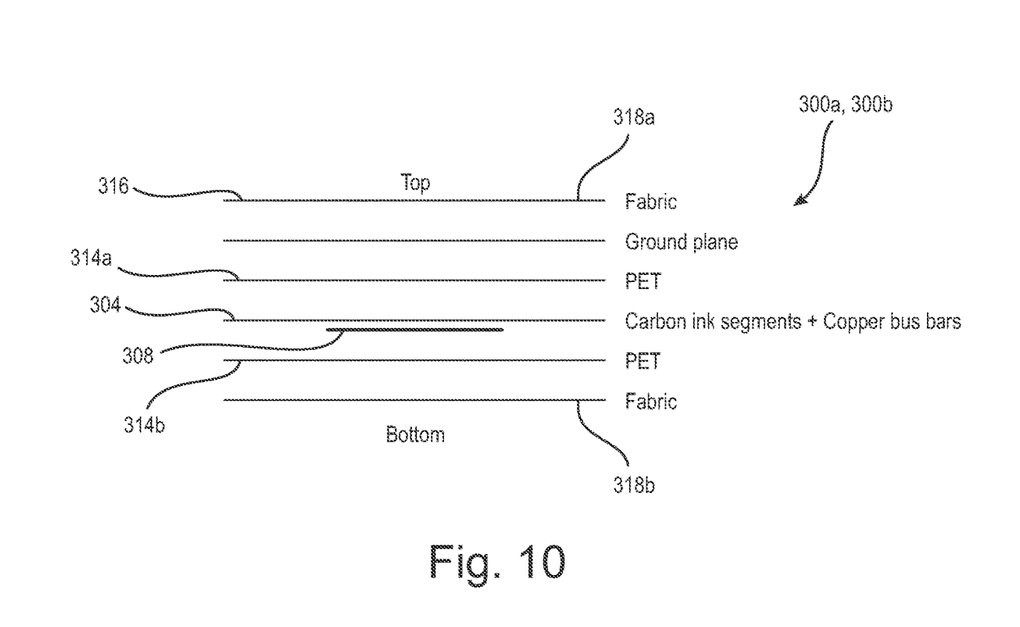
FIG. 10 is a schematic drawing showing the configuration of the material layers of the floor heating systems of FIGS. 8 and 9.

FIG. 10 shows an example of a layout of the heating devices 300a, 300b illustrated in FIGS. 8 and 9 above. As shown in FIG. 10, each heating device 300a, 300b is manufactured by printing the carbon ink segments 308 on the substrate 304 and attaching one or more of the bus bars 310 (FIG. 8) to the substrate 304. An electrical insulating layer 314a, 314b made of Polyethylene Terephthalate (PET) or other suitable plastic or electrical insulating material, is attached to each side of the substrate 304. A grounding layer 316 made of a suitable conductive material, such as a grounding electrode made of copper or other suitable metal, is attached to one of the insulating layers 314a, 314b. The grounding layer 316 grounds the heating devices 300a, 300b and thereby helps prevent overheating of the heating devices or other electrical issues. Once the core of each of the heating devices 300a, 300b is made, a fabric material layer 318a, 318b is attached to the grounding layer 316 and to the bottom insulating layer 314b. The fabric material layers 318a, 318b may be any suitable material or combination of materials. For example, the fabric material layers may be nonwoven fabric of the SMS, SMMS or SSMMS types having suitable hydrophobic qualities, where "S" stands for spunbound and "M" stands for meltblown.

Figure 11:
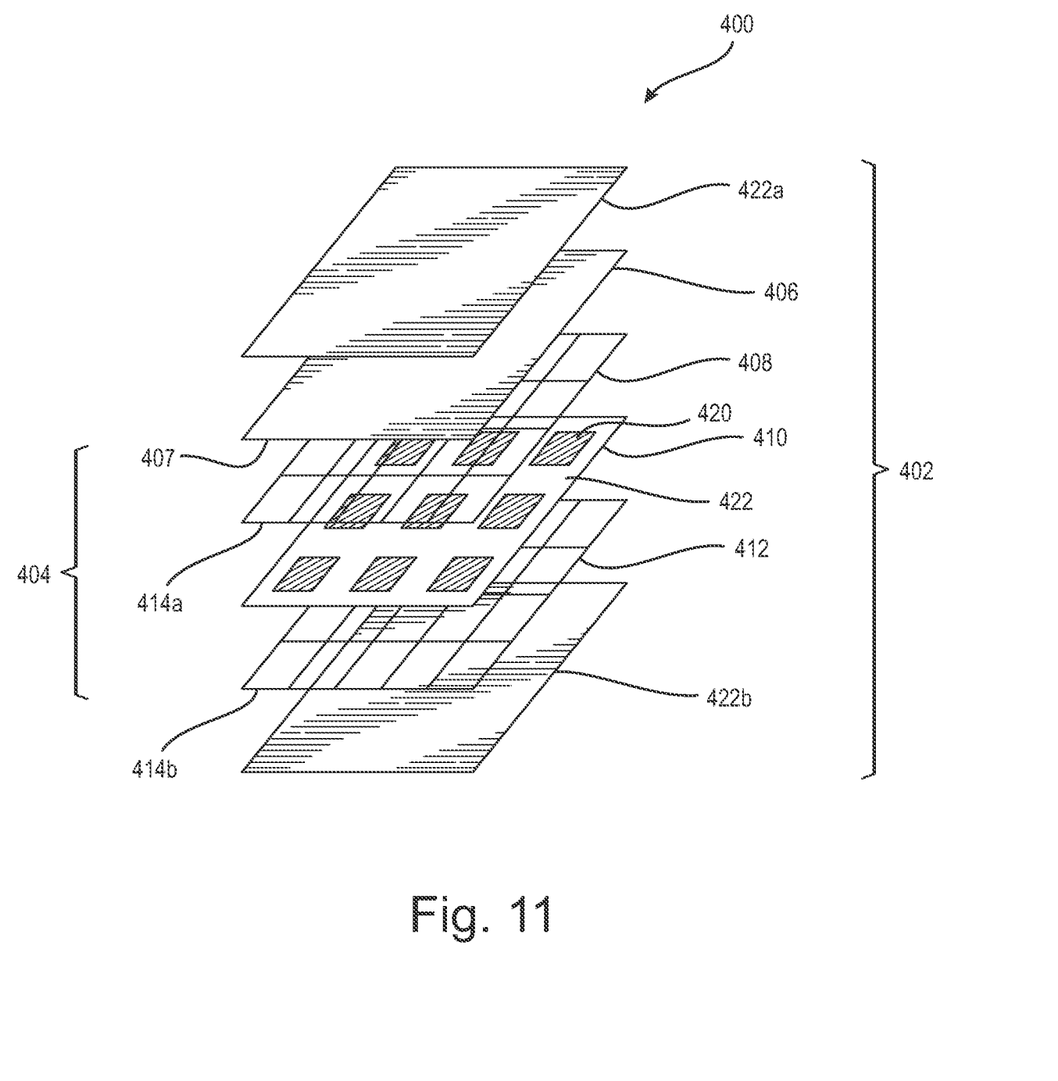
FIG. 11 is an exploded perspective view of another embodiment of the present floor heating system configured as a mat.

FIG. 11 shows an embodiment of the heating device 400 that is formed as a heating mat 402 that includes a core 404 comprising a grounding layer 406, a positive grid layer 408, an insulating layer 410 and a negative grid layer 412. The grounding layer 406 may be made out of any suitable conductive material, such as a grounding electrode made of copper, or another metal or conductive material, and is connected to a power source by an electrical grounding wire 407. As shown in FIG. 11, the positive grid layer 408 or positive electrode is attached to the grounding layer 406. The positive grid layer 408 is connected to a power source by a positive electrical wire 414a and has a positive electrical charge. Similarly, a negative grid layer or negative electrode 412 has a negative electrical wire 414b connected to the power source having a negative charge. The insulating layer 410 includes heating elements 420 and an insulating material 422 surrounding the heating elements so that the positive grid layer 408 only contacts a first side of each of the heating elements 420 and the negative grid layer 412 only contacts an opposing, second side of each of the heating elements thereby powering each of the heating elements 420 and enabling the heating elements to generate heat. The insulating material 422 is a non-conductive material that separates the positive and negative grid layers 414, 418 so that electricity only flows through the heating elements. Alternatively, spacers or separators (not shown) are placed at crossover points on the positive and negative grid layers 414, 418 to separate the positive and negative grid layers so that the positive grid layer and the negative grid layer only contact opposing sides of the heating elements 420 but not each other. A material layer 422a, 422b is respectively attached to the grounding layer 406 and the negative grid layer 412 to form the mat. It should be appreciated that the material layers 422a, 422b may be fabric layers or any suitable material layers.

In this embodiment, the heating elements 420 may be arranged in a grid pattern but may also be arranged in any suitable configuration. In use, the heating mat 402 may be placed under a floor, such as a tile floor, stone floor or concrete floor, or under carpeting. The heating mat 402 may also be attached to a wall, similar to wall paper, where an adhesive coating is applied to a surface of the heating mat and then the heating mat is attached to the wall. Alternatively, the heating mat 402 may be attached to a ceiling such as an inside surface or an outside surface of a ceiling. It should be appreciated that the heating mat 402 discussed above, may be attached to a surface by: applying an adhesive coating to a surface of the mat, forming a peel and stick membrane on a surface of the mat or the mat may be embedded in a layer of thinset mortar or any suitable material or attached using any suitable attachment method. In each application, the heating mat 402 may be cut to any dimension or size without affecting the supply of electrical power to the heating elements 420.

Figure 12:
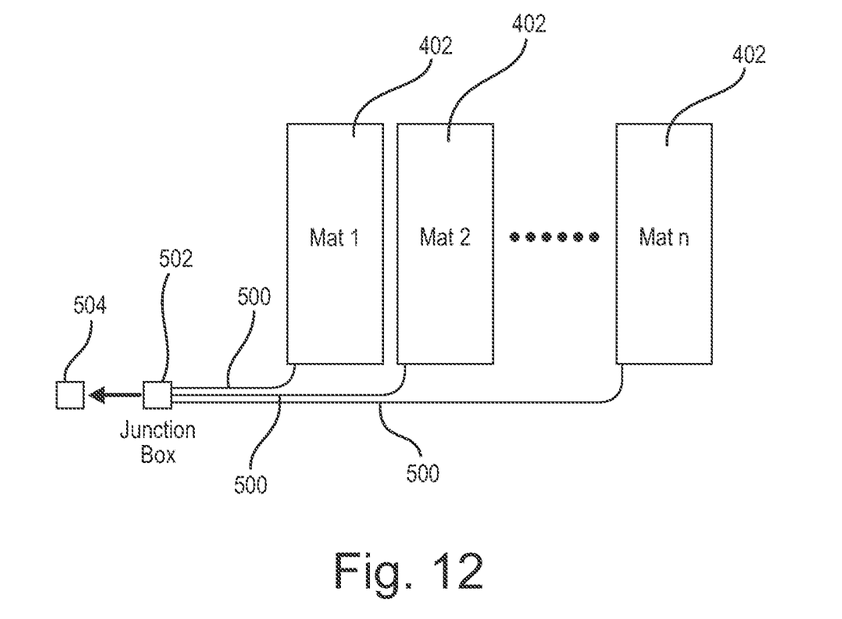
FIG. 12 is a schematic drawing of an embodiment of the floor heating system of FIG. 11 including a plurality of mats connected together where each mat has independent electrical wires connected to an electrical source.
Figure 13:
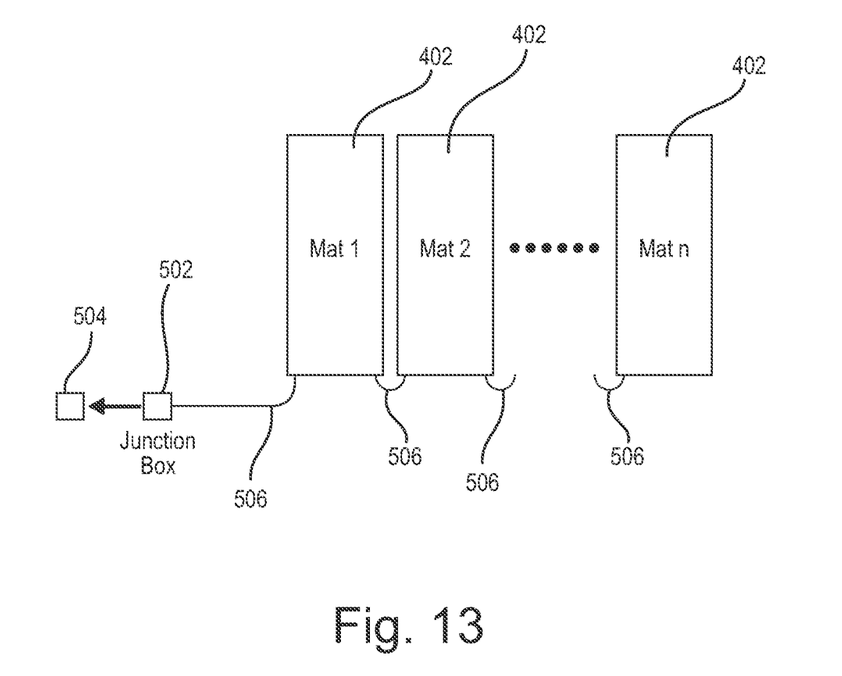
FIG. 13 is a schematic drawing of an embodiment of the floor heating system of FIG. 11 including a plurality of mats connected together where the electrical wires of each mat are connected to an adjacent mat and the electrical wires of one of the mats is connected to an electrical source.

Referring to FIGS. 12 and 13, a plurality of the heating mats 402 shown in FIG. 11 may be connected together to cover relatively large floor, wall and/or ceiling surface areas. In an embodiment, the heating mats 402 are each connected together, either in a side-by-side configuration shown in FIG. 13, an end-to-end configuration or in a combination of side and end connections. In this embodiment, an electrical cable 500 including the positive and negative electrical wires and the ground wire extend from each heating mat 402 are connected to an electrical power source, such as a junction box 502, and then to a thermostat 504.

In another embodiment shown in FIG. 13, the heating mats 402 are connected together as described above but the electrical cable 506 including the positive and negative electrical wires and grounding wire of each heating mat is connected to the immediately adjacent heating mat on one side when the heating mat is the first or last mat in a series of heating mats, or on each side when the heating mat is a middle or intermediate heating mat, in a daisy-chain configuration. In this embodiment, the heating mat at one of the ends of the series or chain of the heating mats 402 is the only mat connected to an electrical power source, such as the junction box 502, where electrical power is transferred from the junction box and then between each of the heating mats. The junction box 502 is also connected to a temperature controller, such as the thermostat 504, for controlling the temperature of the heating mat(s). Alternatively, the junction box 502 may be connected to a wireless controller so that the temperature of the heating mats may be controlled wirelessly via a remote Wi-Fi controller such as a laptop computer, a tablet computer or cellular phone. Similarly, each heating mat 402 in the series or chain of heating mats may have daisy chain connectors that are Wi-Fi controlled so that each heating mat is controlled independently of each adjacent heating mat. In the above embodiments, the temperature controller may be a smart thermostat such that one or more of the heating mats 402 may be set to a designated temperature, or the temperature of one or more heating zones including one or more of the heating mats 402 may be set to a designated temperature.

Figure 14A:
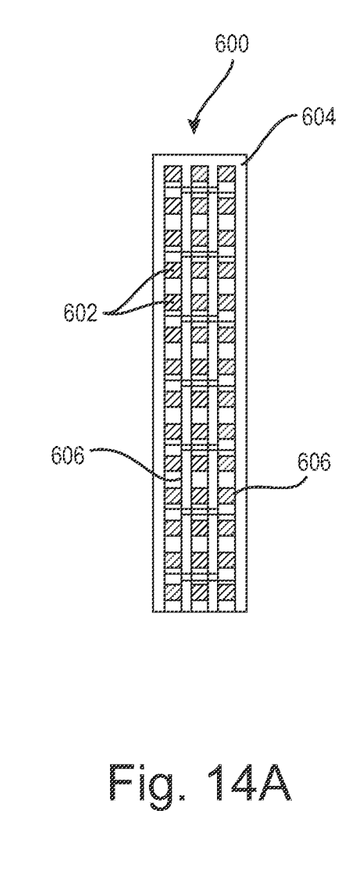
FIG. 14A is a schematic drawing of a further embodiment of the present floor heating system.
Figure 14B:
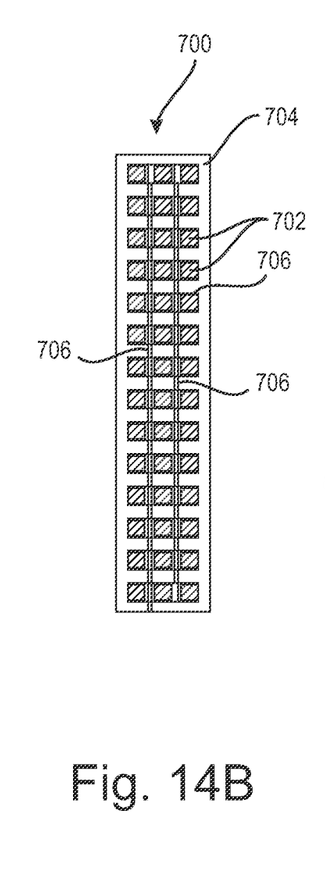
FIG. 14B is a schematic drawing of another embodiment of the present floor heating system.
Figure 14C:
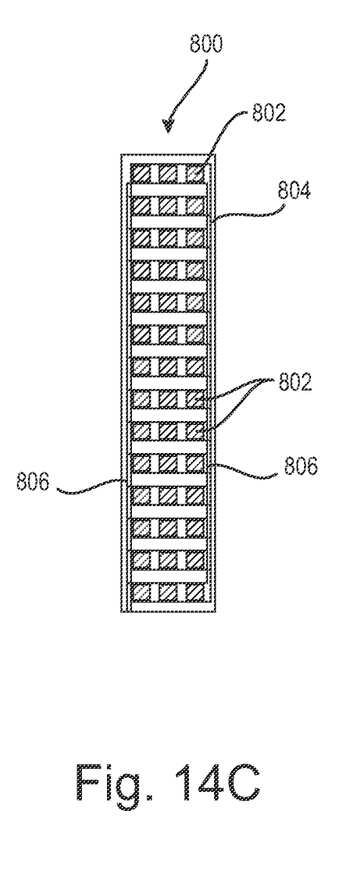
FIG. 14C is a schematic drawing of a further embodiment of the present floor heating system.
Figure 14D:
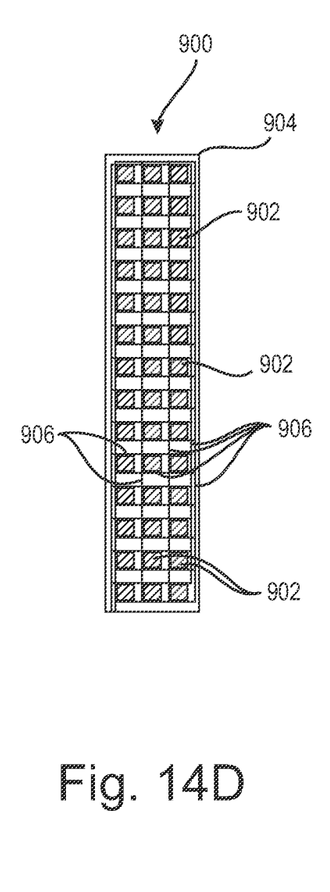
FIG. 14D is a schematic drawing of another embodiment of the present floor heating system.

Referring to FIGS. 14A, 14B, 14C and 14D, additional embodiments of the present heating system are shown where the heating elements, bus bars and wires of the heating devices are configured in different patterns to accommodate different floor, wall and ceiling layouts and areas. In FIG. 14A, the heating device 600 includes several rows of heating elements 602 on a membrane or substrate 604 where each row includes three of the heating elements 602 that are spaced from each other and are connected by at least one bus bar 606 extending along at least one side of the heating elements. In FIG. 14B, the heating device 700 is similar to the heating device 600 in FIG. 14A except that the heating elements 702 are laterally positioned closer together on substrate 704 and are interconnected by bus bars 706 positioned along sides of the heating elements and on the top and bottom sides of the heating elements. In FIG. 14C, the heating device 800 includes heating elements 802 that are arranged in a similar pattern on the substrate 804 to the heating elements in FIGS. 14A and 14B. In this embodiment, a bus bar 806 is attached to each side of the substrate 804 and electrically connected to the heating elements. FIG. 14D shows a heating device 900 having heating elements 902 arranged in a similar pattern on substrate 904 to the heating elements in FIGS. 14A, 14B and 14C where a bus bar 906 is attached to each side of the substrate and between each column of the heating elements. In these example embodiments, the heating systems are constructed similar to the heating system shown in FIG. 8, where the heating elements are printed on the membrane or substrate with a carbon ink having a designated resistance such that the heating elements may operate at voltages ranging from 6 volts to 240 volts depending on the designated resistance. It should be appreciated that the present heating system may have heating elements arranged in any suitable pattern or combination of patterns.

In the above embodiments, the membrane is made of a flexible material so that it can be rolled up in a roll for transport to a location and easily unrolled and cut at the location for installation. The width of the membrane may be five to six feet but may be any suitable width depending on the size and shape of a floor on which the heating device is being installed. As stated above, on larger floors, two or more of the heating devices may be installed side-by-side, where each of the heating devices is connected to the same or different power sources.

In conventional floor heating systems having electrical wire-type heating elements, the heating elements may be damaged during the installation of a finished floor over the heating system due to contact by a trowel, i.e., tile installation, or other tool when a finished floor is installed over the heating elements or during handling of the floor heating system at an installation location. Thus, the membrane of the present heating device is made of a durable and robust material to help resist damage to the membrane during installation of the heating device and during installation of a finished floor over the heating device.

In the above embodiments, the present floor heating system has intrinsic uncoupling properties to ensure that the heating system has enough flexibility to minimize stresses from the flooring substrate on a finished floor, such as a tile, stone or concrete floor, so that the finished floor is not compromised or damaged in any way. Also, it is contemplated that the above embodiments of the present floor heating system may be used to provide comfort heat, such as heating a cold tile floor, or as a primary heating source for a space, such as being the primary heating source for one or more rooms in a house or building or for an entire house or building.

While particular embodiments of the present floor heating system are shown and described, it will be appreciated by those skilled in the art that changes and modifications may be made thereto without departing from the invention in its broader aspects and as set forth in the following claims.

What is claimed is:

1. A heating device for a floor, comprising:
   a membrane;
   a plurality of heating elements attached to said membrane;
   a plurality of positively charged electrodes on said membrane, said positively charged electrodes attached said heating elements; and
   a plurality of negatively charged electrodes on said membrane, said negatively charged electrodes attached to said heating elements,
   wherein said positively charged electrodes and said negatively charged electrodes are connected to an electrical power source and supply electrical power to said heating elements,
   wherein a first positively charged electrode of said positively charged electrodes and a first negatively charged electrode of said negatively charged electrodes are each connected to a first set of heating elements of said plurality of heating elements,
   wherein a second positively charged electrode of said positively charged electrodes and a second negatively charged electrode of said negatively charged electrodes are each connected to a second set of heating elements of said plurality of heating elements,
   wherein said first positively charged electrode is different than said second positively charged electrode, and said first negatively charged electrode is different than said second negatively charged electrode,
   said heating elements, said positively charged electrodes and said negatively charged electrodes being arranged on said membrane so that cutting of said membrane along a cutting line in any direction across said membrane does not disrupt the supply of electrical power to said heating elements.

2. The heating device of claim 1, further comprising a no-cut zone on said membrane wherein said no-cut zone is an area of said membrane that the cutting line does not contact.

3. The heating device of claim 1, wherein said heating elements, said at least one positively charged electrode and said negatively charged electrode are arranged in a grid pattern.

4. The heating device of claim 1, wherein said heating elements, said first or second positively charged electrode and said first or second negatively charged electrode are arranged as at least one elongated strip on said membrane.

5. The heating device of claim 1, wherein said membrane and said heating elements form a first layer, said positively charged electrodes form a second layer and said negatively charged electrodes form a third layer, wherein said first layer, said second layer and said third layer are attached together so that said positively charged electrodes contact a first surface of each of said heating elements and said negatively charged electrodes contact a second surface of each of said heating elements.

6. The heating device of claim 1, wherein said heating elements are printed on said membrane with carbon ink.

7. The heating device of claim 1, wherein at least one material layer is attached to each side of said membrane.

8. The heating device of claim 1, wherein said membrane is made of an insulating material.

9. The heating device of claim 1, wherein one of said heating elements is in said first set and said second set of heating elements.

10. A heating mat comprising:
    an insulating layer including a plurality of heating elements;
    a positive grid layer including a plurality of positively charged electrodes attached on a first side of said insulating layer;
    a negative grid layer including a plurality of negatively charged electrodes a second side of said insulating layer, wherein said positive grid layer and said negative grid layer are connected to an electrical power source and supply electrical power to said heating elements; and
    a grounding layer attached to said positive grid layer,
    wherein a first positively charged electrode of said positively charged electrodes and a first negatively charged electrode of said negatively charged electrodes are each connected to a first set of heating elements of said plurality of heating elements,
    wherein a second positively charged electrode of said positively charged electrodes and a second negatively charged electrode of said negatively charged electrodes are each connected to a second set of heating elements of said plurality of heating elements,
    wherein said first positively charged electrode is different than said second positively charged electrode, and said first negatively charged electrode is different than said second negatively charged electrode,
    wherein said insulating layer, said positive grid layer, said negative grid layer and said grounding layer are arranged so that cutting of the mat along a cutting line in any direction across the mat does not disrupt the supply of electrical power to said heating elements.

11. The heating mat of claim 10, further comprising at least one material layer attached to grounding layer and said negative grid layer.

12. The heating mat of claim 11, wherein said at least one material layer is a fabric layer.

13. A heating system including a plurality of the heating mats of claim 10 connected together, wherein each of said heating mats are independently, electrically connected to a power source.

14. A heating system including a plurality of the heating mats of claim 10 connected together, wherein one of said heating mats is electrically connected to a power source and the remaining heating mats are electrically connected to each other.

15. The heating mat of claim 10, wherein one of said heating elements is in said first set and said second set of heating elements.

* * * * *